United States Patent
Senda et al.

(10) Patent No.: US 12,553,102 B2
(45) Date of Patent: Feb. 17, 2026

(54) GRAIN-ORIENTED ELECTRICAL STEEL SHEET

(71) Applicant: JFE STEEL CORPORATION, Tokyo (JP)

(72) Inventors: Kunihiro Senda, Tokyo (JP); Yoshihisa Ichihara, Tokyo (JP); Takeshi Omura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 246 days.

(21) Appl. No.: 18/041,798

(22) PCT Filed: Aug. 18, 2021

(86) PCT No.: PCT/JP2021/030260
§ 371 (c)(1),
(2) Date: Feb. 16, 2023

(87) PCT Pub. No.: WO2022/050053
PCT Pub. Date: Mar. 10, 2022

(65) Prior Publication Data
US 2023/0304123 A1    Sep. 28, 2023

(30) Foreign Application Priority Data

Sep. 4, 2020   (JP) ................. 2020-149453

(51) Int. Cl.
| | | |
|---|---|---|
| *H01F 1/18* | (2006.01) |
| *C21D 8/1277* | (2026.01) |
| *C21D 8/1294* | (2026.01) |
| *C21D 10/00* | (2006.01) |
| *C22C 38/00* | (2006.01) |

(52) U.S. Cl.
CPC ......... *C21D 10/005* (2013.01); *C21D 8/1277* (2013.01); *C21D 8/1288* (2013.01); *C21D 8/1294* (2013.01); *H01F 1/18* (2013.01); *C21D 2201/05* (2013.01); *C21D 2221/00* (2013.01); *C22C 38/00* (2013.01)

(58) Field of Classification Search
CPC ....................................... H01F 1/18
See application file for complete search history.

(56) References Cited

U.S. PATENT DOCUMENTS

| | | | |
|---|---|---|---|
| 6,368,424 B1 | 4/2002 | Sakai et al. |
| 11,225,698 B2 | 1/2022 | Takajo et al. |
| 2013/0143050 A1 | 6/2013 | Omura et al. |
| 2013/0206283 A1 | 8/2013 | Inoue et al. |
| 2014/0352849 A1 | 12/2014 | Suehiro et al. |
| 2015/0310973 A1 | 10/2015 | Takajo et al. |
| 2017/0182591 A1 | 6/2017 | Arai et al. |
| 2017/0253940 A1 | 9/2017 | Takajo et al. |
| 2018/0037965 A1 | 2/2018 | Takajo et al. |
| 2019/0292623 A1 | 9/2019 | Nagoshi et al. |
| 2020/0283863 A1 | 9/2020 | Senda et al. |
| 2021/0027939 A1 | 1/2021 | Omura et al. |

FOREIGN PATENT DOCUMENTS

| | | |
|---|---|---|
| CN | 1216072 A | 5/1999 |
| CN | 103069035 A | 4/2013 |
| CN | 104755636 A | 7/2015 |
| CN | 110669916 A | 1/2020 |
| CN | 111133118 A | 5/2020 |
| EP | 0611829 A1 | 8/1994 |
| EP | 0897016 A1 | 2/1999 |
| EP | 3211104 A1 | 8/2017 |
| JP | 3482340 B2 | 12/2003 |
| JP | 2012036450 A | 2/2012 |
| JP | 2012172191 A | 9/2012 |
| JP | 2015206114 A | 11/2015 |
| JP | 2016156047 A | 9/2016 |
| JP | 2016166419 A | 9/2016 |
| JP | 6169695 B2 | 7/2017 |
| JP | 2020105589 A | 7/2020 |
| WO | 2013099258 A1 | 7/2013 |
| WO | 2014068962 A1 | 5/2014 |

(Continued)

OTHER PUBLICATIONS

Nov. 16, 2021, International Search Report issued in the International Patent Application No. PCT/JP2021/030260.

(Continued)

*Primary Examiner* — Jophy S. Koshy
(74) *Attorney, Agent, or Firm* — KENJA IP LAW PC (57) ABSTRACT

To provide a grain-oriented electrical steel sheet that can achieve both sufficiently low transformer core loss and sufficiently low noise. Disclosed is a grain-oriented electrical steel sheet having a tension coating on a surface thereof and subjected to magnetic domain refining treatment by generating linear closure domains extending in a direction within 30° of a transverse direction, in which an average interval L between adjacent closure domains is 15 mm or less, a depth ratio $r_d$ of a depth of the closure domains to a sheet thickness, calculated by a predetermined formula, is 35% or more, and a volume fraction $r_v$ of the closure domains, calculated by a predetermined formula, is 0.30% or more and 3.0% or less, and an area ratio $r_s$ of the closure domains, calculated by a predetermined formula, is 0.50% or more and 4.0% or less.

4 Claims, 4 Drawing Sheets

(56) References Cited

FOREIGN PATENT DOCUMENTS

| WO | 2016063317 A1 | 4/2016 |
| WO | 2019189857 A1 | 10/2019 |

OTHER PUBLICATIONS

Nov. 22, 2022, Notification of Reasons for Refusal issued by the Japan Patent Office in the corresponding Japanese Patent Application No. 2021-571481 with English language Concise Statement of Relevance.

Apr. 23, 2024, Office Action issued by the Canadian Intellectual Property Office in the corresponding Canadian Patent Application No. 3,187,406.

Dec. 2, 2024, Office Action issued by the Korean Intellectual Property Office in the corresponding Korean Patent Application No. 10-2023-7003779 with English language concise statement of relevance.

Jun. 28, 2025, Office Action issued by the China National Intellectual Property Administration in the corresponding Chinese Patent Application No. 202180052315.9 with English language search report.

Mar. 1, 2025, Office Action issued by the China National Intellectual Property Administration in the corresponding Chinese Patent Application No. 202180052315.9 with English language search report.

Jan. 24, 2024, the Extended European Search Report issued by the European Patent Office in the corresponding European Patent Application No. 21864111.6.

Oct. 22, 2025, Office Action issued by the China National Intellectual Property Administration in the corresponding Chinese Patent Application No. 202180052315.9 with English language Concise Statement of Relevance.

GRAIN-ORIENTED ELECTRICAL STEEL SHEET

TECHNICAL FIELD

This disclosure relates to a grain-oriented electrical steel sheet that can reduce both loss and noise in transformers.

BACKGROUND

Grain-oriented electrical steel sheets are mainly used for, e.g., iron cores of transformers, and are required to have excellent magnetic properties, in particular, low iron loss. A variety of processes have been proposed to improve the magnetic properties of grain-oriented electrical steel sheets, including: improving the orientation of crystal grains constituting a steel sheet so that the crystal grains highly accord with the Goss orientation (namely, increasing the frequency of crystal grains with the Goss orientation); applying tension coating to a steel sheet to increase the tension imparted thereto; and applying magnetic domain refinement to a steel surface by introducing strain or forming grooves on its surface.

Among these, conventional techniques for reducing iron loss through magnetic domain refining by introducing strain include irradiating a steel sheet surface with a plasma flame, laser beam, electron beam, or the like to introduce strain thereto.

For example, JP 2012-172191 A (PTL 1) describes that the iron loss of a grain-oriented electrical steel sheet is reduced by optimizing the output and irradiation time of an electron beam.

As described above, reduction of the iron loss of grain-oriented electrical steel sheets is being promoted. However, even if transformers are fabricated by using, in their iron cores, grain-oriented electrical steel sheets with such low iron loss, this does not necessarily lead to a reduction in the iron loss of the resulting transformers (transformer core loss).

This is because when evaluating the iron loss of a grain-oriented electrical steel sheet itself, excitation magnetic flux components are present only in the rolling direction, whereas when the steel sheet is actually used as the iron core of a transformer, excitation magnetic flux components are present not only in the rolling direction but also in the transverse direction (direction orthogonal to the rolling direction).

Building factor (BF) is an index that is commonly used to represent the difference in iron loss between a blank sheet itself and a transformer formed from the blank sheet, and is defined as a ratio of the iron loss of the transformer to the iron loss of the blank sheet. When the BF is more than 1, this means that the iron loss of the transformer is greater than the iron loss of the blank sheet.

Grain-oriented electrical steel sheets have the lowest iron loss of the blank sheets when magnetized in the rolling direction. Therefore, when incorporated into transformers that are magnetized not only in the rolling direction but also in other directions, the iron loss of the grain-oriented electrical steel sheets increase. As a result, BF is more than 1.

In other words, to improve the energy efficiency of the transformer, it is not enough to keep the iron loss of the blank sheet low, and it is important to make the BF as close to 1 as possible, that is, to make the iron loss value of the transformer close to the iron loss value of the blank sheet.

Regarding the issue concerning BF, for example, JP 2012-36450 A (PTL 2) describes a technique for providing a transformer with good iron loss properties by optimizing the interval between dot sequences formed by electron beam irradiation in a dot-sequence manner.

Alternatively, focusing on closure domains that are formed at the time of magnetic domain refining using laser irradiation, techniques have also been proposed to reduce iron loss by optimizing the shape and dimensions of closure domains (see JP 3482340 B (PTL 3)).

In the non-heat-resistant magnetic domain refining technology discussed above, development has focused on reducing the iron loss of the material itself of grain-oriented electrical steel sheets by making the 180° magnetic domain wall interval (hereinafter referred to as the 180° magnetic domain width) as narrow as possible.

On the other hand, focusing on the characteristics of transformers in which grain-oriented electrical steel sheets are used, the reduction in transformer core loss and noise is one of the main development issues related to the iron core material. Needless to say, if the iron loss of the grain-oriented electrical steel sheet as the iron core material is reduced, the transformer core loss will be reduced. However, in transformers of three-phase tripod (five-leg) type that are commonly used, it is known that the transformer core loss increases more than the material iron loss, that is, the above-mentioned BF becomes greater than 1.

Therefore, it is not appropriate to pursue only iron loss reduction in the material itself of grain-oriented electrical steel sheets in order to improve the characteristics of the transformers as the final products. It is instead necessary to develop materials that would contribute to the reduction in BF in transformers along with the reduction in the material iron loss.

In addition, transformers are required to have a low noise property depending on their operating environment. Transformer noise is of two types: no-load noise, which is emitted from the iron core under no load, and load noise, which is the sum of the noise from the iron core and the noise from the coils under load. Iron core noise, which is a factor in transformer noise both under no load and under load, is strongly influenced by the iron core material, and, in particular, magnetostrictive vibration of the iron core material is said to be a main cause of iron core noise.

Therefore, there is a demand for a grain-oriented electrical steel sheet that has low magnetostriction as well as low iron loss and low BF as the material of such transformers.

The non-heat-resistant magnetic domain refining method for grain-oriented electrical steel sheets, which is often used as a manufacturing method effective in iron loss reduction, is a method to reduce the 180° magnetic domain width by the effect of magnetic poles produced in closure domain regions formed by introducing local linear strain sites to a steel sheet using some method as mentioned above (hereinafter also referred to as non-heat-resistant magnetic domain refining treatment).

However, when the entire steel sheet is magnetized under alternating current (AC) magnetization conditions, the formation and annihilation of such closure domains inevitably increase the magnetostriction amplitude, which tends to increase the iron core noise.

Therefore, it is also important in this respect to prevent deterioration of noise property as much as possible in grain-oriented electrical steel sheets subjected to non-heat-resistant magnetic domain refining treatment.

CITATION LIST

Patent Literature

PTL 1: JP 2012-172191 A
PTL 2: JP 2012-36450 A

PTL 3: JP 3482340 B
PTL 4: WO 2013/099258 A
PTL 5: JP 6169695 B
PTL 6: WO 2014/068962 A
PTL 7: JP 2015-206114 A

SUMMARY

Technical Problem

However, conventional technologies have not been able to address all of these issues: reducing material iron loss, reducing BF, and preventing deterioration of noise property.

For example, PTL 1 describes the technology to not only reduce the iron loss of the steel sheet itself as mentioned above, but also to prevent BF degradation while improving noise property. In this technology, however, the measure to prevent BF degradation in this technology is through the suppression of sheet warpage caused by electron beam irradiation.

In other words, such technology is a measure to prevent deterioration in extreme situations where the magnetic domain refining treatment causes warpage of the steel sheet and increase in iron core loss, and is not a measure to actively improve BF in situations where sheet warpage is not pronounced.

The method described in PTL 2 also attempts to improve transformer BF in grain-oriented electrical steel sheets subjected to non-heat-resistant magnetic domain refining treatment. In other words, this technology reduces iron loss in the transverse direction and improves BF by introducing strain regions in a dot-sequence manner and optimizing the size and interval of these regions.

However, this technology focuses only on closure domains generated by thermal distortion, and is not sufficient to improve BF. In addition, improvements in noise property are not pursued.

The technology described in PTL 3 attempts to improve noise property in the material subjected to magnetic domain refining by laser irradiation. However, this technology is based on the conventional laser irradiation method, and the conditions for generating closure domains are not sufficient, and the perspective of BF reduction is not considered.

In addition, the technology described in WO 2013/099258 A (PTL 4) attempts to improve noise property in grain-oriented electrical steel sheets with controlled magnetic domains. However, this technology merely controls the volume fraction of closure domains and does not demonstrate the effect on the BF of transformers. Consequently, reduction in both iron loss and noise is not sufficient.

The technology described in JP 6169695 B (PTL 5) specifies the length of closure domains in the thickness direction and rolling direction for the purpose of BF improvement, but does not consider the noise of the transformer.

WO 2014/068962 A (PTL 6) describes the technology to properly control the width, depth, and interval of closure domains with the aim of maximizing the effect of iron loss reduction by magnetic domain refining treatment according to the thickness of the material. However, this technology does not consider noise and BF.

The technology described in JP 2015-206114 A (PTL 7) specifies appropriate values for the introduction of closure domains in terms of spike-shaped magnetic domains extending from the closure domains and prevention of increased hysteresis loss in order to obtain lower iron loss. However, this technology does not provide better conditions than before in terms of noise and BF.

As described above, in the conventional grain-oriented electrical steel sheets subjected to non-heat-resistant magnetic domain refining treatment, there have been no attempts to reduce both loss (material iron loss and BF) and noise in transformers.

In view of the above, it would thus be helpful to provide a grain-oriented electrical steel sheet that can achieve both sufficiently low transformer core loss and sufficiently low noise.

Solution to Problem

As a result of our diligent research to solve the above issues, the present inventors have found that by appropriately controlling the volume fraction and area ratio of closure domains on a steel sheet surface, a sufficiently low iron loss property can be obtained for a grain-oriented electrical steel sheet used as the material for transformers. Moreover, the present inventors have found that the use of such a steel sheet can achieve a sufficiently low BF, providing excellent transformer core loss and low noise properties.

The present inventors have completed the present disclosure based on such findings.

Specifically, primary features of the present disclosure are as follows. As used herein, the invention described in aspect 1 below, excluding the inventions described in aspects 2 and 3 below, will be referred to as Invention 1. The invention described in aspect 2 below, excluding the invention described in aspect 3 below, will be referred to as Invention 2. The invention described in aspect 3 below will be referred to as Invention 3.

1. A grain-oriented electrical steel sheet having a tension coating on a surface thereof and subjected to magnetic domain refining treatment by generating linear closure domains extending in a direction within 30° from a transverse direction, wherein letting T [mm] be a sheet thickness, d [mm] be a depth of the closure domains with respect to a surface to which the magnetic domain refining treatment has been applied, L [mm] be an average interval between adjacent closure domains on the surface, $S_R$ [mm$^2$] be a cross-sectional area of the closure domains in a cross-section orthogonal to linear strain regions, and w [mm] be a width of the closure domains, the average interval L is 15 mm or less, a depth ratio $r_d$ of a depth of the closure domains to the sheet thickness, calculated by (d/T)×100, is 35% or more, a volume fraction $r_v$ of the closure domains, calculated by $\{S_R/(LT)\}\times 100$, is 0.30% or more and 3.0% or less, and an area ratio $r_s$ of the closure domains, calculated by (w/L)×100, is 0.50% or more and 4.0% or less.

2. The grain-oriented electrical steel sheet according to aspect 1, wherein the depth ratio $r_d$ is 39% or more, and the volume fraction $r_v$ [%] and the area ratio $r_s$ [%] satisfy a relation expressed by:

$$r_s \leq 2.6 r_v \qquad (1).$$

3. The grain-oriented electrical steel sheet according to aspect 2, wherein the volume fraction $r_v$ is 0.75% or more, and the volume fraction $r_v$ [%] and the area ratio $r_s$ [%] satisfy a relation expressed by:

$$r_s \leq 1.2 r_v + 0.9 \qquad (2).$$

4. The grain-oriented electrical steel sheet according to any one of aspects 1 to 3, wherein linear strain sites for generating linear closure domains are formed by a plurality of strain introduction portions being arranged in a dot-sequence manner, and letting D [mm] be a diameter of the strain introduction portions and A [mm] be a distance between centers of adjacent strain introduction portions, a relation expressed by the following formula is satisfied:

$$1.2D \leq A \leq 3D \tag{d}$$

Advantageous Effect

According to the present disclosure, by improving the magnetic properties of a grain-oriented electrical steel sheet, it is possible to not only reduce transformer core loss but also improve BF of three-phase transformers, thereby contributing to the production of transformers with lower iron loss and preventing the deterioration of transformer noise, which is often a disadvantage with a grain-oriented electrical steel sheet subjected to non-heat-resistant magnetic domain refining treatment. According to the present disclosure, it is also possible to obtain a grain-oriented electrical steel sheet subjected to non-heat-resistant magnetic domain refining treatment that can provide transformers with excellent iron loss and noise properties in a well balanced manner.

DETAILED DESCRIPTION

This disclosure will be described in detail below.
[Grain-Oriented Electrical Steel Sheet]

In the present disclosure, a grain-oriented electrical steel sheet having a tension coating on a surface thereof is irradiated continuously or intermittently with a high-energy beam in a direction within 30° of a transverse direction (direction orthogonal to a rolling direction) to form a plurality of strain sites in a continuous linear manner or in a dot-sequence manner. No particular limitation is placed on the type of grain-oriented electrical steel sheets used as the base material, and various types of known grain-oriented electrical steel sheets may be used.
[Tension Coating]

A grain-oriented electrical steel sheet used in the disclosure has a tension coating on a surface thereof. No particular limitation is placed on the type of tension coating. As the tension coating, for example, it is possible to use a two-layer coating that is formed by a forsterite film, which is formed in final annealing and contains $Mg_2SiO_4$ as a main component, and a phosphate-based tension coating formed on the forsterite film.

In addition, a phosphate-based tension-applying insulating coating may be directly formed on a surface of the steel sheet not having the forsterite film. The phosphate-based tension-applying insulating coating may be formed, for example, by coating a surface of a steel sheet with an aqueous solution containing a metal phosphate and silica as main components, and baking the coating onto the surface. In the present disclosure, if the tension coating will not be damaged by beam irradiation, it is not necessary to recoat for repair after beam irradiation. However, if coating damage may occur, it is preferable to perform recoating with a coating that can be formed at a low temperature of 300° C. or lower for both insulation and corrosion protection.
[Plurality of Linear Strain Sites]

The grain-oriented electrical steel sheet disclosed herein has strain portions that are formed in a continuous linear manner or in a dot-sequence manner and that extend linearly in a direction intersecting the rolling direction (hereinafter collectively referred to as "linear strain sites"). These strain sites have the function of refining magnetic domains and reducing iron loss. The plurality of linear strain sites are parallel to each other and are provided at predetermined intervals as described later.

These strain sites generate closure domains. The strain sites are the same sites with the same size as the closure domains under certain conditions. The closure domains are identified as described later.
[Direction of Plurality of Linear Strain Sites]

It is known that in grain-oriented electrical steel sheets subjected to non-heat-resistant magnetic domain refining treatment, linear strain sites are preferably formed to extend in the transverse direction or at an angle within a specified range from the transverse direction. In the present disclosure, linear strain regions are also formed to extend in a direction within 30° from the transverse direction.
[High-Energy Beam Irradiation]

The plurality of linear strain sites may be formed by irradiating the surface of the steel sheet on which the tension coating is formed with a focused high-energy beam. The type of high-energy beam is not limited. However, electron beams, among others, are characterized by the suppression of coating damage due to high accelerating voltage and the ability to control the beam at high speed. Therefore, it is preferable to use an electron beam in the present disclosure.

High-energy beam irradiation is performed while scanning a beam from one end to the other in the width direction of the steel sheet, using one or more irradiation devices (for example, electron gun(s)). The beam is scanned in a direction orthogonal to the rolling direction (i.e., in the transverse direction) or in a direction within 30° from the transverse direction. As the deviation from the transverse direction increases, the magnetic domain refining effect decreases and iron loss increases.
[Average Interval L between Adjacent Closure Domains: 15 mm or Less]

Figure 1:
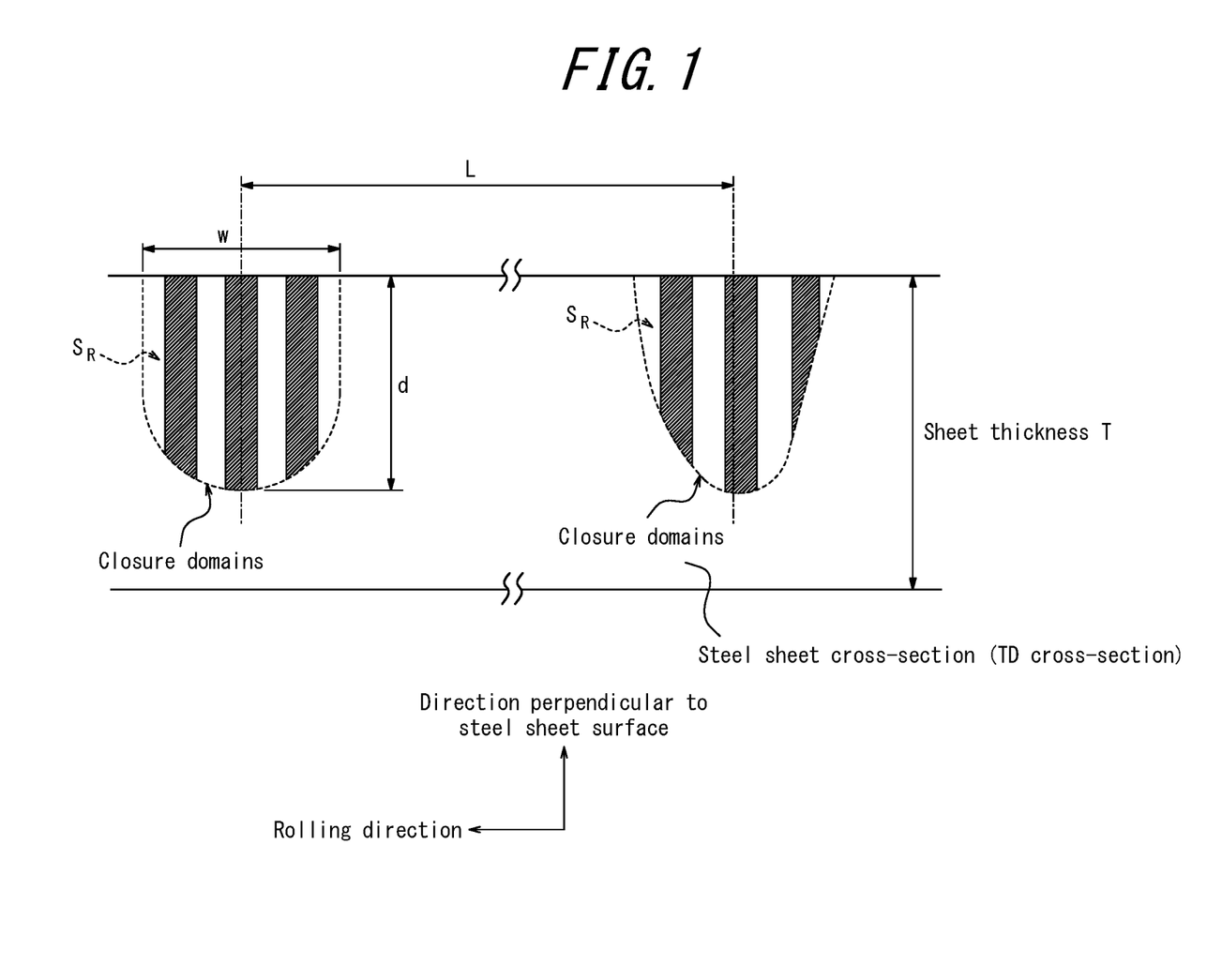
FIG. 1 schematically illustrates closure domains observed in a cross-section orthogonal to linear strain regions of a steel sheet.

Regarding the closure domains generated in a linear manner according to the present disclosure, an average interval between adjacent closure domains (distance between centers of adjacent closure domains in a direction orthogonal to the direction in which the adjacent closure domains extend), i.e., an average interval L (see FIG. 1) is 15 mm or less. If the average interval L exceeds 15 mm, the magnetic domain refining effect is not sufficient, and the iron loss of the steel sheet after subjection to magnetic domain refining increases. On the other hand, the average interval L is preferably 3 mm or more. By setting the average interval L to 3 mm or more, the processing time can be shortened to increase production efficiency, making it possible to prevent formation of excessive strain regions in the steel, which would otherwise result in increased hysteresis loss and magnetostriction. The interval of the closure domains is the interval between the widthwise centers of the closure domains observed on a surface of the steel sheet as illustrated in FIG. 1. The average interval L is the interval obtained by averaging the results from observing 10 or more of the linear closure domains. For example, if 10 closure domains are considered and the total interval is $L_{10}$, the average interval L is calculated by $L_{10}/9$.

[Depth Ratio $r_d$ of Depth of Closure Domains to Sheet Thickness: 35% or More (for Invention 1), 39% or More (for Invention 2)]

In order to sufficiently reduce the iron loss in the material of grain-oriented electrical steel sheets, it is ideal to introduce magnetic poles as uniformly as possible in the thickness direction. As for the depth of the closure domains, it is preferable that the depth be sufficiently large, relative to the sheet thickness, from the surface to which the non-heat resistant magnetic domain refining treatment has been applied. In the present disclosure, a sufficiently low iron loss value can be obtained by setting the ratio of the depth of the closure domains to the sheet thickness, i.e., the depth ratio $r_d$, to 35% or more. Furthermore, by setting the depth ratio $r_d$ to 39% or more, it is possible to achieve an even lower iron loss value.

Also, by making the closure domains deeper, it is possible to control the volume fraction $r_v$ and the area ratio $r_s$ of the closure domains in the ranges specified below. The upper limit of the depth ratio $r_d$ is not limited and may be 100%.

[Volume Fraction $r_v$ of Closure Domains: 0.30% or More and 3.0% or Less (for Invention 1), 0.75% or More and 3.0% or Less (for Invention 3)]

A large volume fraction $r_v$ of the closure domains makes it easier for the magnetic flux originating from the closure domains to flow in the transverse direction, thus improving BF in an iron core of tripod type in which the magnetic flux in the iron core should flow not only in the rolling direction but also other directions. To obtain a sufficient BF improving effect, the volume fraction $r_v$ needs to be 0.30% or more. The volume fraction $r_v$ needs to be 3.0% or less, since exceeding 3.0% leads to an increase in iron loss due to increased hysteresis loss. To further ideally reduce the transformer core loss, it suffices for the volume fraction $r_v$ to be 0.75% or more.

The volume fraction $r_v$ of the closure domains can be determined by observing magnetic domains in a cross-section orthogonal to the linear strain regions. Specifically, as illustrated in FIG. 1, letting $S_R$ [mm²] be the cross-sectional area of closure domains in the cross-section orthogonal to the linear strain regions determined by the magnetic domain observation and T [mm] be the sheet thickness, and using the above-described average interval L [mm] between the closure domains, the volume fraction $r_v$ of the closure domains can be calculated by $\{S_R/(LT)\} \times 100$.

The closure domains illustrated schematically in FIG. 1 are visualized in an image obtained by preparing a sample with a cross-section orthogonal to the linear strain regions as the observation plane, subjecting the sample to buff polishing for a long time until no machining effects are observed, and then observing the magnetic domains using the Kerr effect. From the image thus obtained, the closure domain portions can be identified by the difference in pattern from the surrounding untreated portions, and the area of the closure domain portions can be determined as a cross-sectional area $S_R$.

The method of magnetic domain observation is not limited, yet the one using the Kerr effect is suitably used. In the above cross-section, one region near the surface (i.e., ¼ of the sheet thickness) is referred to as a surface layer of the steel sheet, and the remainder from the surface layer to the mid-thickness part (i.e., the remaining ½ of the sheet thickness) is referred to as an inner layer of the steel sheet.

[Area Ratio $r_s$ of Closure Domains: 0.50% or More and 4.0% or Less (for Invention 1), $r_s \leq 2.6 r_v$ (for Invention 2), $r_s \leq 1.2 r_v + 0.9$ (for Invention 3)]

One of the most important points of the present disclosure is to control the area ratio $r_s$ of the closure domains within a predetermined range, and more preferably to reduce the area ratio $r_s$ with a certain relationship to the volume fraction $r_v$. The area ratio $r_s$ of the closure domains is evaluated at the beam-irradiated surface, and can be calculated by $(w/L) \times 100$ using the above-described width w [mm] and average interval L [mm] of the closure domains on this surface.

In the present disclosure, firstly, for the purpose of sufficiently reducing the iron loss in the material, the depth ratio $r_d$ of the depth of the closure domains to the sheet thickness needs to be set above a certain value. Secondly, for the purpose of reducing BF, which is a factor causing an increase in the transformer core loss, the volume fraction $r_v$ of the closure domains needs to be set above a certain level. Then, the existence ratio of the closure domains on the surface, i.e., the area ratio $r_s$ of the closure domains, is set below a certain value. As a result, the BF of the transformer can be further reduced.

According to the present disclosure, it is possible to suppress the increase in transformer noise under conditions where the depth and volume of the closure domains are sufficiently high for the purpose of reducing the iron loss in the transformer. The mechanism behind this may be as follows.

Since closure domains tend to produce magnetization components in the transverse direction of the steel sheet, the BF improves as the volume of the closure domain increases in the first order. The reason may be that the magnetization components in the transverse direction are produced in the largest amount at a T- or L-junction of a transformer with a three-phase laminate iron core, and the magnetization behavior in such part has a strong influence on BF. In other words, the rotating magnetic flux in a T- or L-junction is established by those magnetization components in the rolling direction resulting from 180° magnetic domain wall movement and other magnetization components in the transverse direction resulting from changes in the magnetic domain structure. Accordingly, the progress of magnetization is facilitated in the transverse direction inside the closure domain portions of the material subjected to non-heat-resistant magnetic domain refining treatment, resulting in good BF. Thus, in the first order, a larger volume of the closure domains tends to improve BF.

Presumably, the reason may be that in those parts where the rotating magnetic flux is generated, magnetization is caused in the transverse direction inside the closure domain portions, and the closure domains cause changes in the magnetic domain structure in the 180° magnetic domain structural portion, thus making the magnetization in the transverse direction in the 180° magnetic domain structural portion easier to progress.

If the volume of the closure domains is increased only in the surface layer and the distribution of closure domains in the inner layer becomes non-uniform, changes in the magnetization in the rolling direction in the 180° magnetic domain structural portion and changes in the magnetization in the transverse direction inside the closure domains interfere with each other in those portions where the rotating magnetic flux is generated in the surface layer. This fact is expected to increase the iron loss of the steel sheet. In addition, in the lower part in the thickness direction where no closure domain exists in the case of beam irradiation being performed on only one surface (near an opposite surface to the surface on which the closure domains have been introduced), it is presumed that changes in the magnetic domain structure originating from the closure domains are unlikely to occur in the 180° magnetic domain structural portion.

On the other hand, if the area ratio $r_s$ of the closure domains is kept below a certain level relative to the volume fraction $r_v$ of the closure domains, and as the distribution of closure domains in the thickness direction becomes more uniform accordingly, the difference in volume fraction $r_v$ of the closure domains between the surface layer and the inner layer of the steel sheet will decrease. As a result, it is believed that the iron loss in those parts where the rotating magnetic flux is generated is reduced, providing lower transformer core loss (BF).

As used herein, the rotating magnetic flux means that when the time variation of the magnetization vector is observed, the trajectory of the vector tip relative to the origin of the magnetization vector is two-dimensional and has a circular, elliptic, or diamond shape, or a shape similar to these.

If the difference in magnetization progress between the surface layer and the inner layer of the steel sheet is large, the magnetization components in the transverse direction tend to be established mainly in the surface layer alone, which likely causes a distorted magnetostrictive waveform containing harmonics. This would result in an increase in transformer noise.

Therefore, as per Invention 1, setting the area ratio $r_s$ of the closure domains in the range of 0.50% to 4.0% is effective for noise reduction through reduction of BF. To obtain even higher effectiveness, as per Invention 2, the relation expressed by formula (1), $r_s \leq 2.6 r_v$, should be satisfied. To further enhance this effect, as per Invention 3, the relation expressed by formula (2), $r_s \leq 1.2 r_v + 0.9$, should be satisfied.

The following describes in more detail how to derive the area ratio $r_s$ of the closure domains, the depth ratio $r_d$ of the depth of the closure domains to the sheet thickness, and the volume fraction $r_v$ of the closure domains.

[Area Ratio $r_s$ of Closure Domains]

After demagnetizing the grain-oriented electrical steel sheet to be evaluated, the width of the closure domains on the surface of the steel sheet is determined to calculate the area ratio $r_s$ of the closure domains. Specifically, the area ratio $r_s$ [%] of the closure domains is calculated by the following formula (a) using the average interval L [mm] of the closure domains and the width w [mm] (average width) of the closure domains:

$$r_s = (w/L) \times 100 \tag{a}$$

To ensure the accuracy of the value of the area ratio $r_s$, the width w is determined by averaging the results of measuring the width at five or more different locations in the surface of the steel sheet. As a method of magnetic domain observation to determine the width of the closure domains in the sheet surface, magnetic domain observation using magnetic powder, or magnetic domain observation using the Faraday effect, or a method using high-voltage SEM is suitably used. The width of the closure domains may be determined by removing the insulating tension coating from the sheet surface and mirror polishing the sheet surface, and then observing the magnetic domains using the Kerr effect. More specifically, a width w (average) of the closure domains can be calculated as an average width that is obtained by averaging the results of measuring a width wi at 10 or more different locations at 0.2 mm to 5 mm intervals for one linear closure domain region to obtain an average width <wi>, repeating the measurement for a total of 10 or more linear closure domain regions, and averaging the results from the linear closure domain regions measured.

The average interval L of the closure domains is calculated by $L_N/(N-1)$, where $N \geq 10$ and $L_N$ denotes the intervals of N linear closure domains.

[Depth Ratio $r_d$ of Depth of Closure Domains to Sheet Thickness, Volume Fraction $r_v$ of Closure Domains]

In a cross-section orthogonal to the direction in which the linear strain regions extend, magnetic domain observation using the Kerr effect is performed to investigate the formation of closure domains in the thickness direction, and the depth d [mm] and cross-sectional area $S_R$ [mm$^2$] of the closure domains are determined. The depth ratio $r_d$ [%] of the depth of the closure domains to the sheet thickness and the volume fraction $r_v$ [%] of the closure domains are calculated by the following formulas (b) and (c) respectively using the sheet thickness T [mm]:

$$r_d = (d/T) \times 100 \tag{b}$$

$$r_v = \{S_R/(LT)\} \times 100 \tag{c}$$

In this case, the depth d of the closure domains means the distance between the deepest point in a closure domain portion and the surface of the steel sheet, as observed in FIG. 1 at any location in the steel sheet. The cross-sectional area $S_R$ may be determined by image processing the area of a closure domain portion where the magnetic domain pattern differs from the surrounding untreated portions. The depth d and cross-sectional area $S_R$ of the closure domains are respectively determined by averaging the results of measuring the depth and cross-sectional area at five or more different locations within the steel sheet to ensure measurement accuracy.

[Diameter and Interval of Strain Introduction Portions]

The iron loss can be reduced more effectively by forming linear strain sites for generating closure domains with a plurality of strain introduction portions arranged in a discrete (dot-sequence) manner. While the details of the reason for this are unclear, it is considered that when closure domains are generated originating from strain introduction portions and connected to one another in the direction of irradiation line to thereby exhibit a linear magnetic domain refining effect, such dot-sequence arrangement makes it possible to reduce the amount (volume) of introduced strain that would cause hysteresis degradation. In this case, since the energy beam diameter corresponds to the region of each strain introduction portion, the energy beam diameter may be considered as the diameter of each strain induction portion. Then, letting D [mm] be the diameter of the strain introduction portions (i.e., energy beam diameter) and A [mm] be the distance between the centers of adjacent strain introduction portions, the iron loss in the material can be effectively reduced while ensuring the BF and transformer noise improving effect obtained according to the present disclosure, if a relation expressed by the following formula is satisfied:

$$1.2D \leq A \leq 3.0D \tag{d}$$

When $1.2D \leq A$, the iron loss in the material can be reduced because closure domains can be effectively generated with a minimum amount of strain introduced while preventing an increase in hysteresis loss, as described above. On the other hand, when $A > 3.0D$, the generation of closure domains is insufficient and the magnetic domain refining effect is impaired. Therefore, it is preferable to satisfy the relation in formula (d).

[how to Derive Volume Fraction $r_v$ and Depth Ratio $r_d$ for Strain Introduction Portions Arranged in Dot-Sequence Manner]

When a plurality of strain introduction portions are arranged in a dot-sequence manner for generating closure domains, the area of closure domains generated differs depending on the position in the irradiation line. This makes it difficult to determine the cross-sectional area $S_R$ by magnetic domain observation in the cross-section orthogonal to the transverse direction as illustrated in FIG. 1.

Since each strain induction portion spreads over a region of half the radius, D/2, of the energy beam from the center, strain induction portions can be considered continuous if adjacent ones overlap or are sufficiently close together (A<1.2D). On the other hand, if A≥1.2D, the formation of closure domains becomes non-uniform, or the depth of closure domains cannot be observed by magnetic domain observation along the cross-section orthogonal to the irradiation direction in the surface of the steel sheet as illustrated in FIG. 1.

In such cases, the magnetostriction can be used to derive the volume fraction $r_v$, and thus the depth ratio $r_d$, of the closure domains. Since the volume of the closure domains and the magnetostriction $\lambda_{0-P}$ are closely related, the volume fraction $r_v$ can be derived by the magnetostriction $\lambda_{0-P}$. This is because as magnetization progresses, closure domains with magnetization components in the thickness and transverse directions disappear, and the steel sheet begins to have magnetization components in the rolling direction, with the result that the steel sheet elongates in the rolling direction, and elongation in the material is greatest at the moment when the magnetic flux density of the material reaches its maximum.

According to our research, $\lambda_{0-P}$ is closely related to the volume of closure domains in the material subjected to non-heat-resistant magnetic domain refining treatment, and is also strongly affected by the amount of lancet domains that the material has in the absence of closure domains.

Therefore, it is possible to evaluate the volume of closure domains based on the difference between $\lambda_{0-P}^{D}$ in the presence of closure domains and $\lambda_{0-P}^{P}$ in the absence of closure domains where the closure domains were made to disappear through stress relief annealing, expressed by: $\Delta\lambda_{0-P}=\lambda_{0-P}^{D}-\lambda_{0-P}^{P}$. In this case, the equation was solved from the magnetostriction waveform during magnetization under magnetic flux sinusoidal alternating current (AC) magnetization conditions with a maximum magnetic flux density Bm of 1.7 T at 50 Hz. The stress relief annealing was performed in the temperature range of about 700° C. to about 760° C. If the temperature of the stress relief annealing is too low, the strain introduced by the energy beam cannot be sufficiently removed. If the temperature of the stress relief annealing is too high, changes in coating quality and other factors would reduce the accuracy of evaluation of changes in the magnetostrictive property.

Our research revealed that $\lambda_{0-P}$ was about $2.6\times10^{-7}$ when the volume fraction of closure domains was 1.0%. Thus, for a freely-selected material, the volume fraction $r_v$ [%] of closure domains can be determined by:

$$r_v=\{1.0/(2.6\times10^{-7})\}\times\Delta\lambda_{0-P}=3.85\times10^6\times\Delta\lambda_{0-P} \quad (e).$$

In addition, assuming that the cross-sectional shape of closure domains is rectangular, the depth of the closure domains can be determined by the volume fraction $r_v$ and width w of the closure domains. In actual cases, however, there are deviations from the rectangle as schematically illustrated in FIG. 1. In addition, when the cross-sectional shape is rectangular, the cross-sectional area $S_R$ of the closure domains is assumed to be wd. Our research revealed, however, that the actual cross-sectional area $S_R$ was about 80% of wd. In view of the foregoing, the depth ratio $r_d$ of the depth of the closure domains to the sheet thickness can be determined by:

$$r_v=\{S_R/(LT)\}\times100=\{0.80wd/(LT)\}\times100$$

$$r_d=(d/T)\times100=\{L/(0.80w)\}\times r_v=\{L/(0.80w)\}\times(3.85\times10^6\times\Delta\lambda_{0-P})=4.81\times(L/w)\times\lambda_{0-P}\times10^6 \quad (f).$$

The derivation of the volume fraction $r_v$ and the depth ratio $r_d$ as set forth above can be applied when A≥1.2D and the volume of the closure domains is difficult to determine by magnetic domain observation.

Next, the following describes the manufacturing conditions of the product according to the present disclosure. The non-heat-resistant magnetic domain refining treatment disclosed herein may be performed using a single or combination of methods that can introduce localized linear strain sites in the steel sheet, such as electron beams, laser beams, plasma flames, and mechanical contact of terminals. However, in order to satisfy the requirements of the present disclosure, a method using electron beams that can generate closure domains deep in the steel sheet is particularly suitable.

The following provides details of the conditions under which magnetic domain refining treatment according to the disclosure is carried out by electron beam irradiation.

In order to generate deeper closure domains in the thickness direction, one possible option is increasing the beam current. However, this option increases the width of closure domains in the surface layer of the steel sheet, and the conditions of the present disclosure cannot be satisfied. Therefore, it is necessary for the grain-oriented electrical steel sheet subjected to magnetic domain refining according to the present disclosure to allow a narrow electron beam to reach deep into the steel sheet in the thickness direction. It is thus preferable to use a proper combination of existing manufacturing methods described below.

[Accelerating Voltage Va of Electron Beam]

In the case of using an electron beam, a higher accelerating voltage is preferable. This is because the higher the acceleration voltage, the higher the material permeability of the electron beam is. By increasing the accelerating voltage sufficiently, the electron beam can penetrate the tension coating more easily. A high accelerating voltage increases the depth of closure domains in the thickness direction because the center of heat generation in the steel substrate is located farther (deeper) from the surface of the steel sheet. Moreover, a higher accelerating voltage has the advantage of making it easier to reduce the beam diameter. To obtain this effect, the accelerating voltage is preferably 80 kV or higher, and more preferably 100 kV or higher. On the other hand, if the accelerating voltage exceeds 400 kV, the electron beam reaches the opposite side of the steel sheet to the beam irradiation side, and the effect reaches a plateau. Thus, the advantage of increasing the accelerating voltage beyond 400 kV is small. Therefore, the accelerating voltage is preferably 400 kV or lower.

[Beam Diameter]

The smaller the beam diameter in a direction orthogonal to the scanning direction of the beam, the more advantageous it is to reduce the iron loss in the material. To obtain the effect of the present disclosure, it is effective to reduce the electron beam diameter according to the accelerating voltage. Specifically, letting Va [kV] be the accelerating voltage, it is preferable that the beam diameter satisfy the relation of beam diameter [μm]≤−0.85Va+270 with 80 kV≤Va≤200 kV, and that the beam diameter be 100 μm or less with Va>200 kV.

The reason for these beam diameter limitations is that as the accelerating voltage increases, deeper closure domains are generated, and the beam diameter needs to be narrowed to keep the volume of closure domains within the range specified in the present disclosure. However, if the accelerating voltage exceeds 200 kV, the depth of closure domains generated becomes almost equal to or greater than the sheet thickness for an electrical steel sheet having a sheet thickness of 0.23 mm or less, which is the target of the present disclosure. In this case, the effect of narrowing the beam diameter becomes saturated. Therefore, it suffices for the beam diameter to be 100 μm or less.

As used herein, the beam diameter is defined as the width at half-maximum of the beam profile measured by the slit method (using a slit of 0.03 mm in width). When the beam profile is elliptical on the surface of the steel sheet, the beam diameter is the length in the direction orthogonal to the scanning direction.

No lower limit is placed on the beam diameter in the direction orthogonal to the scanning direction, yet a preferred lower limit is 8 μm or more. If the beam diameter in the direction orthogonal to the scanning direction is smaller than 8 μm, the working distance needs to be extremely small, and the range that can be covered by one electron beam source for deflection irradiation is greatly reduced.

On the other hand, if the beam diameter in the direction orthogonal to the scanning direction is 8 μm or more, a single electron beam source can irradiate a wide range. The beam diameter in the direction orthogonal to the scanning direction is more preferably 30 μm or more.

[Beam Current: 0.5 mA to 30 mA]

The beam current is preferably as small as possible from the perspective of beam diameter reduction. If the beam current is excessively large, beam focusing is hampered by Coulomb repulsion between electrons. Therefore, in this disclosure, the beam current is preferably 30 mA or less. More preferably, the beam current is 20 mA or less. On the other hand, when the beam current is excessively small, strain sites necessary for obtaining a sufficient magnetic domain refining effect cannot be formed. Therefore, in this disclosure, the beam current is preferably 0.5 mA or more. The beam current is more preferably 1 mA or more, and still more preferably 2 mA or more.

EXAMPLES

Next, the present disclosure will be described based on examples.

Example 1

Hot-rolled sheets as the base material of grain-oriented electrical steel sheets were subjected to hot-rolled sheet annealing, then cold-rolled to the final sheet thickness (0.23 mm or 0.18 mm), and then subjected to decarburizing annealing. Subsequently, an annealing separator mainly composed of MgO was applied to each product, which in turn was subjected to final annealing to produce a grain-oriented electrical steel sheet with a forsterite film. Then, insulating tension coating containing colloidal silica and magnesium phosphate was formed on the surface of the forsterite film. A surface of each steel sheet was then irradiated with an electron beam to form a plurality of linear strain regions extending in a direction intersecting the rolling direction. The average scanning rate of the electron beam was 100 m/s. The angle of the linear strain sites with respect to the rolling direction (line angle) was set to 90°. The beam diameter D and the interval A between the strain introduction portions satisfied the relation of A=0.8D. Other processing conditions were as listed in Table 1.

The magnetic properties of each steel sheet thus obtained were evaluated by the single sheet magnetic test method under the magnetic flux sinusoidal conditions of the maximum magnetic flux density of 1.7 T at the frequency of 50 Hz.

Then, an iron core was fabricated from each steel sheet for a transformer of three-phase tripod type for testing (external dimensions: 500 mm×500 mm, width of legs and joints: 100 mm (rectangular cross-section), stacked thickness: 50 mm, joining method: step lap method (lap length 3 mm)), and the transformer core loss was measured. In this case, the transformer core loss was the iron loss in the transformer under no-load conditions, and was obtained by measuring the iron loss at the maximum magnetic flux density of 1.7 T at the legs of the iron core at the frequency of 50 Hz, and dividing the result by the mass of the iron core (in unit of W/kg). The transformer core loss thus obtained was divided by the iron loss in the material measured on a single sheet to obtain BF.

After demagnetizing each steel sheet (at the maximum attainable magnetic flux density of 1.95 T at the frequency of 50 Hz), the width w of closure domains was determined by magnetic domain observation on the surface of the steel sheet using magnetic powder, and the area ratio $r_s$ of the closure domains was calculated by formula (a) using L listed in Table 1. In this case, w was determined by averaging the results of measuring the width at ten different locations inside each steel sheet. L was determined by $L_N/(N-1)$, where N≥10 and $L_N$ denotes the intervals of N linear closure domains.

Furthermore, magnetic domain observation using the Kerr effect was performed in a cross-section orthogonal to the direction in which the linear strain regions extend in each steel sheet to investigate the formation of closure domains in the thickness direction, and the depth d and cross-sectional area $S_R$ of the closure domains were determined. In this case, the depth and cross-sectional area were measured at 10 different locations inside each steel sheet, and d and $S_R$ were determined by averaging the measurement results, and the depth ratio $r_d$ and the volume fraction $r_v$ were calculated using formulas (b) and (c), respectively.

TABLE 1

| No. | Sheet thickness T (mm) | Beam Accelerating voltage (kV) | Beam diameter D (mm) | Beam current (mA) | Angle from transverse direction (°) | Depth d (mm) | Depth ratio $r_d$ (%) | Width W (mm) | Single volume | Average interval L (mm) | Area ratio $r_S$ (%) | Cross-sectional area $S_R$ (mm²) | Volume fraction $r_V$ (%) | Single sheet (W/kg) | Transformer (W/kg) | BF | Transformer noise (dBA) | Remarks | Remarks 2 |
|---|---|---|---|---|---|---|---|---|---|---|---|---|---|---|---|---|---|---|---|
| 1 | 0.23 | 150 | 0.170 | 10 | 0 | 0.077 | 33 | 0.196 | 0.015 | 5 | 3.92 | 0.0115 | 1.00 | 0.691 | 0.871 | 1.260 | 43.0 | Comparative Ex. | |
| 2 | 0.23 | 90 | 0.210 | 12 | 0 | 0.064 | 28 | 0.262 | 0.017 | 5 | 5.24 | 0.0161 | 1.40 | 0.699 | 0.880 | 1.259 | 42.5 | Comparative Ex. | |
| 3 | 0.23 | 90 | 0.210 | 10 | 0 | 0.067 | 29 | 0.244 | 0.016 | 5 | 4.88 | 0.0138 | 1.20 | 0.699 | 0.885 | 1.266 | 42.8 | Comparative Ex. | |
| 4 | 0.23 | 150 | 0.170 | 10 | 0 | 0.062 | 27 | 0.181 | 0.011 | 5 | 3.62 | 0.0104 | 0.90 | 0.705 | 0.892 | 1.265 | 42.9 | Comparative Ex. | |
| 5 | 0.23 | 180 | 0.140 | 15 | 0 | 0.086 | 37 | 0.227 | 0.020 | 5 | 4.54 | 0.0150 | 1.30 | 0.689 | 0.867 | 1.258 | 43.6 | Comparative Ex. | |
| 6 | 0.23 | 150 | 0.120 | 12 | 0 | 0.076 | 33 | 0.207 | 0.016 | 5 | 4.14 | 0.0138 | 1.20 | 0.691 | 0.878 | 1.271 | 43.8 | Comparative Ex. | |
| 7 | 0.23 | 180 | 0.120 | 15 | 0 | 0.081 | 35 | 0.210 | 0.017 | 5 | 4.20 | 0.0138 | 1.20 | 0.685 | 0.875 | 1.277 | 43.7 | Comparative Ex. | |
| 8 | 0.23 | 150 | 0.270 | 10 | 0 | 0.069 | 30 | 0.288 | 0.020 | 5 | 5.76 | 0.0173 | 1.50 | 0.703 | 0.888 | 1.264 | 43.1 | Comparative Ex. | |
| 9 | 0.23 | 150 | 0.100 | 17 | 0 | 0.075 | 33 | 0.195 | 0.015 | 18 | 1.08 | 0.0041 | 0.10 | 0.698 | 0.917 | 1.314 | 44.3 | Comparative Ex. | |
| 10 | 0.23 | 120 | 0.210 | 10 | 0 | 0.075 | 33 | 0.245 | 0.018 | 4 | 6.13 | 0.0147 | 1.60 | 0.700 | 0.880 | 1.257 | 44.4 | Comparative Ex. | |
| 11 | 0.23 | 75 | 0.220 | 10 | 0 | 0.069 | 30 | 0.244 | 0.017 | 4 | 6.10 | 0.0138 | 1.50 | 0.701 | 0.882 | 1.258 | 43.1 | Comparative Ex. | |
| 12 | 0.23 | 75 | 0.220 | 10 | 0 | 0.064 | 28 | 0.244 | 0.016 | 4 | 6.10 | 0.0129 | 1.40 | 0.703 | 0.891 | 1.267 | 43.2 | Comparative Ex. | |
| 13 | 0.23 | 150 | 0.200 | 18 | 0 | 0.080 | 35 | 0.400 | 0.032 | 9 | 4.44 | 0.0269 | 1.30 | 0.704 | 0.891 | 1.266 | 43.1 | Comparative Ex. | |
| 14 | 0.23 | 200 | 0.165 | 16 | 0 | 0.080 | 35 | 0.290 | 0.023 | 16 | 3.00 | 0.0147 | 0.40 | 0.707 | 0.935 | 1.322 | 43.1 | Comparative Ex. | |
| 15 | 0.23 | 125 | 0.240 | 15 | 0 | 0.090 | 39 | 0.400 | 0.036 | 6 | 6.67 | 0.0317 | 2.30 | 0.701 | 0.886 | 1.264 | 45.7 | Comparative Ex. | |
| 16 | 0.23 | 230 | 0.155 | 12 | 0 | 0.180 | 78 | 0.190 | 0.034 | 5 | 3.80 | 0.0368 | 3.20 | 0.681 | 0.867 | 1.273 | 43.4 | Comparative Ex. | |
| 17 | 0.23 | 50 | 0.150 | 10 | 0 | 0.060 | 26 | 0.165 | 0.010 | 6 | 2.75 | 0.0099 | 0.72 | 0.711 | 0.851 | 1.219 | 42.9 | Example | Invention 1 |
| 18 | 0.23 | 80 | 0.120 | 10 | 0 | 0.081 | 35 | 0.130 | 0.011 | 6 | 2.17 | 0.0098 | 0.71 | 0.700 | 0.843 | 1.216 | 42.8 | Example | Invention 1 |
| 19 | 0.23 | 100 | 0.160 | 10 | 0 | 0.082 | 36 | 0.180 | 0.015 | 6 | 3.00 | 0.0110 | 0.80 | 0.677 | 0.841 | 1.245 | 42.6 | Example | Invention 1 |
| 20 | 0.23 | 140 | 0.135 | 16 | 0 | 0.082 | 36 | 0.250 | 0.021 | 7 | 3.57 | 0.0209 | 1.30 | 0.679 | 0.849 | 1.239 | 42.7 | Example | Invention 2 |
| 21 | 0.23 | 140 | 0.124 | 9 | 0 | 0.088 | 38 | 0.100 | 0.009 | 10 | 1.00 | 0.0081 | 0.35 | 0.672 | 0.847 | 1.263 | 42.0 | Example | Invention 2 |
| 22 | 0.23 | 160 | 0.090 | 9 | 0 | 0.100 | 43 | 0.060 | 0.006 | 8 | 0.75 | 0.0064 | 0.35 | 0.674 | 0.836 | 1.257 | 42.3 | Example | Invention 2 |
| 23 | 0.23 | 160 | 0.080 | 9 | 0 | 0.130 | 57 | 0.060 | 0.008 | 12 | 0.50 | 0.0055 | 0.30 | 0.669 | 0.839 | 1.250 | 42.2 | Example | Invention 2 |
| 24 | 0.23 | 170 | 0.105 | 13 | 0 | 0.090 | 39 | 0.140 | 0.013 | 4 | 3.20 | 0.0120 | 1.30 | 0.679 | 0.841 | 1.236 | 42.2 | Example | Invention 2 |
| 25 | 0.23 | 170 | 0.100 | 13 | 0 | 0.090 | 39 | 0.140 | 0.013 | 8 | 1.60 | 0.0129 | 0.70 | 0.678 | 0.839 | 1.239 | 42.3 | Example | Invention 2 |
| 26 | 0.23 | 162 | 0.110 | 16 | 0 | 0.095 | 41 | 0.200 | 0.019 | 8 | 2.30 | 0.0184 | 1.00 | 0.673 | 0.827 | 1.237 | 42.2 | Example | Invention 3 |
| 27 | 0.23 | 185 | 0.090 | 16 | 0 | 0.120 | 52 | 0.170 | 0.020 | 5.5 | 3.09 | 0.0164 | 1.30 | 0.670 | 0.821 | 1.229 | 42.3 | Example | Invention 3 |
| 28 | 0.23 | 180 | 0.080 | 19 | 0 | 0.130 | 57 | 0.180 | 0.023 | 4.5 | 3.50 | 0.0228 | 2.20 | 0.681 | 0.832 | 1.225 | 42.6 | Example | Invention 3 |
| 29 | 0.23 | 184 | 0.080 | 20 | 0 | 0.100 | 43 | 0.200 | 0.020 | 5 | 3.00 | 0.0150 | 1.30 | 0.669 | 0.824 | 1.222 | 42.5 | Example | Invention 3 |
| 30 | 0.23 | 195 | 0.060 | 16 | 0 | 0.120 | 52 | 0.110 | 0.013 | 7 | 1.57 | 0.0138 | 0.86 | 0.668 | 0.820 | 1.232 | 41.7 | Example | Invention 3 |
| 31 | 0.23 | 210 | 0.060 | 19 | 0 | 0.120 | 52 | 0.130 | 0.016 | 8 | 1.63 | 0.0138 | 0.75 | 0.668 | 0.817 | 1.228 | 41.5 | Example | Invention 2 |
| 32 | 0.23 | 200 | 0.055 | 12 | 0 | 0.120 | 52 | 0.070 | 0.008 | 3.5 | 1.80 | 0.0068 | 0.85 | 0.667 | 0.815 | 1.223 | 41.8 | Example | Invention 3 |
| 33 | 0.23 | 200 | 0.070 | 16 | 0 | 0.170 | 74 | 0.120 | 0.020 | 7 | 1.71 | 0.0177 | 1.10 | 0.665 | 0.813 | 1.222 | 41.9 | Example | Invention 3 |
| 34 | 0.23 | 260 | 0.040 | 15 | 0 | 0.170 | 74 | 0.060 | 0.010 | 3 | 2.00 | 0.0097 | 1.40 | 0.668 | 0.811 | 1.221 | 41.9 | Example | Invention 3 |
| 35 | 0.23 | 270 | 0.060 | 19 | 0 | 0.170 | 74 | 0.140 | 0.024 | 4 | 3.00 | 0.0221 | 2.40 | 0.664 | 0.811 | 1.221 | 42.4 | Example | Invention 3 |
| 36 | 0.23 | 300 | 0.040 | 15 | 0 | 0.180 | 78 | 0.065 | 0.012 | 5 | 1.30 | 0.0115 | 1.00 | 0.666 | 0.814 | 1.222 | 41.5 | Example | Invention 3 |
| 37 | 0.18 | 180 | 0.200 | 12 | 0 | 0.128 | 71 | 0.255 | 0.033 | 6 | 4.25 | 0.0292 | 2.70 | 0.582 | 0.744 | 1.278 | 46.5 | Comparative Ex. | |
| 38 | 0.18 | 180 | 0.060 | 15 | 0 | 0.129 | 72 | 0.100 | 0.013 | 6 | 1.67 | 0.0130 | 1.20 | 0.587 | 0.711 | 1.211 | 42.2 | Example | Invention 3 |
| 39 | 0.23 | 160 | 0.080 | 9 | 15 | 0.130 | 57 | 0.060 | 0.008 | 8 | 0.50 | 0.0055 | 0.30 | 0.672 | 0.841 | 1.251 | 42.3 | Example | Invention 2 |
| 40 | 0.23 | 160 | 0.080 | 9 | 30 | 0.130 | 57 | 0.060 | 0.008 | 8 | 0.50 | 0.0055 | 0.30 | 0.681 | 0.849 | 1.247 | 42.2 | Example | Invention 2 |

As shown in Table 1, the transformer core loss and BF were low under those conditions conforming to the present disclosure, and at the same time the noise under excitation conditions was suppressed.

Figure 2:
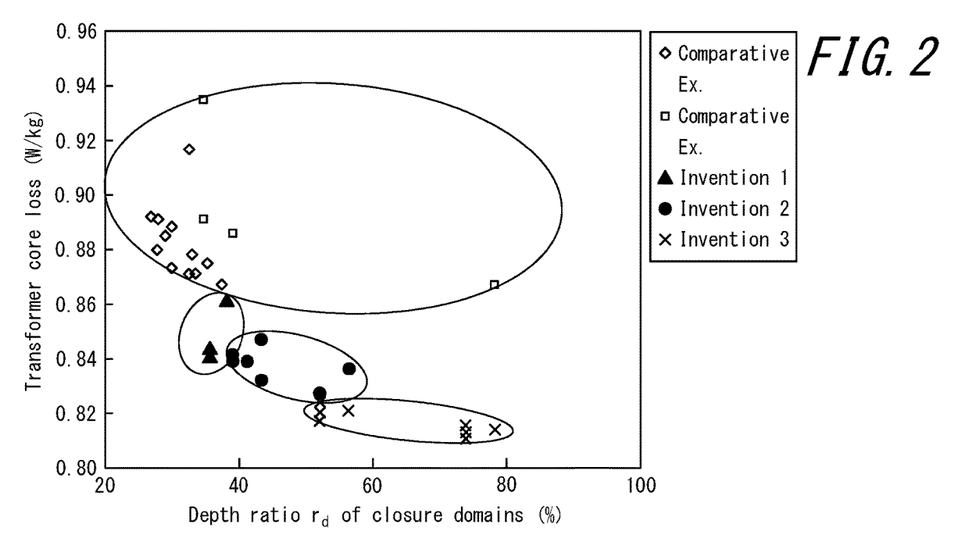
FIG. 2 illustrates a relationship between the depth ratio of closure domains and the transformer core loss.

FIG. 2 illustrates the relationship between the depth ratio $r_d$ of the closure domains and the transformer core loss for an electrical steel sheet having a sheet thickness of 0.23 mm.

In general, as is conventionally known, as the depth of closure domains increases, the material loss tends to decrease, which in turn reduces the transformer core loss. In particular, under the conditions of the present disclosure, it can be seen that the transformer core loss decreases more than expected for the depth of the closure domains. It can also be seen from the figure that the reduction in transformer core loss was more significant under the conditions conforming to Invention 3, Invention 2, and Invention 1, in the stated order.

Figure 3:
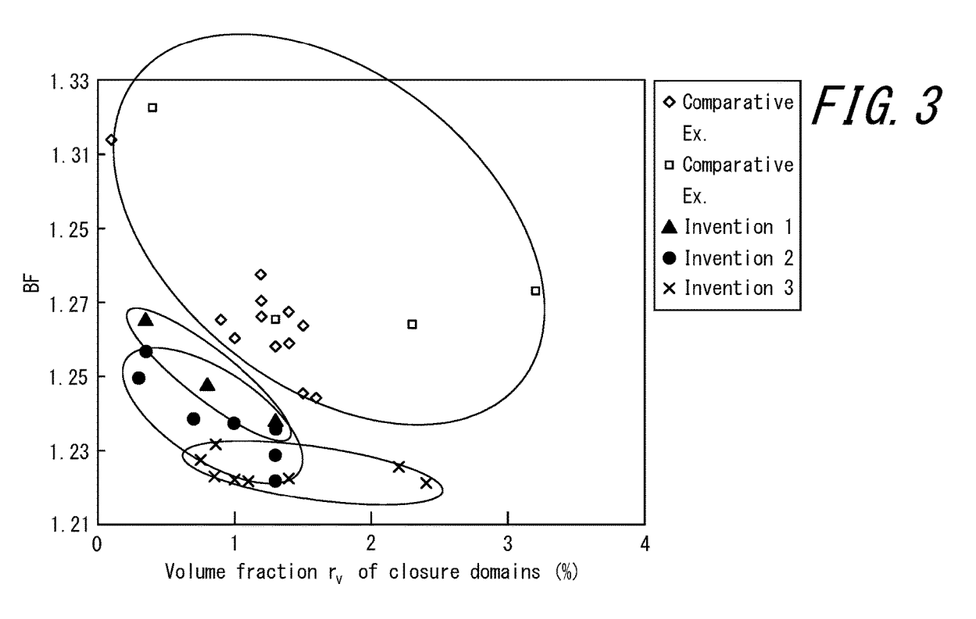
FIG. 3 illustrates a relationship between the volume fraction of closure domains and the transformer BF.

This reduction in transformer core loss beyond the effect of iron loss reduction in the material can be evaluated in terms of BF. FIG. 3 illustrates the relationship between the volume fraction $r_v$ of the closure domains and BF.

In this case, for each condition, BF tended to decrease as the volume fraction $r_v$ of the closure domains increases, as is conventionally known. Under the conditions conforming to the present disclosure, BF improved more than the effect of the volume fraction $r_v$ of the closure domains. This effect was more significant under the conditions conforming to Invention 3, Invention 2, and Invention 1, in the stated order.

Figure 4:
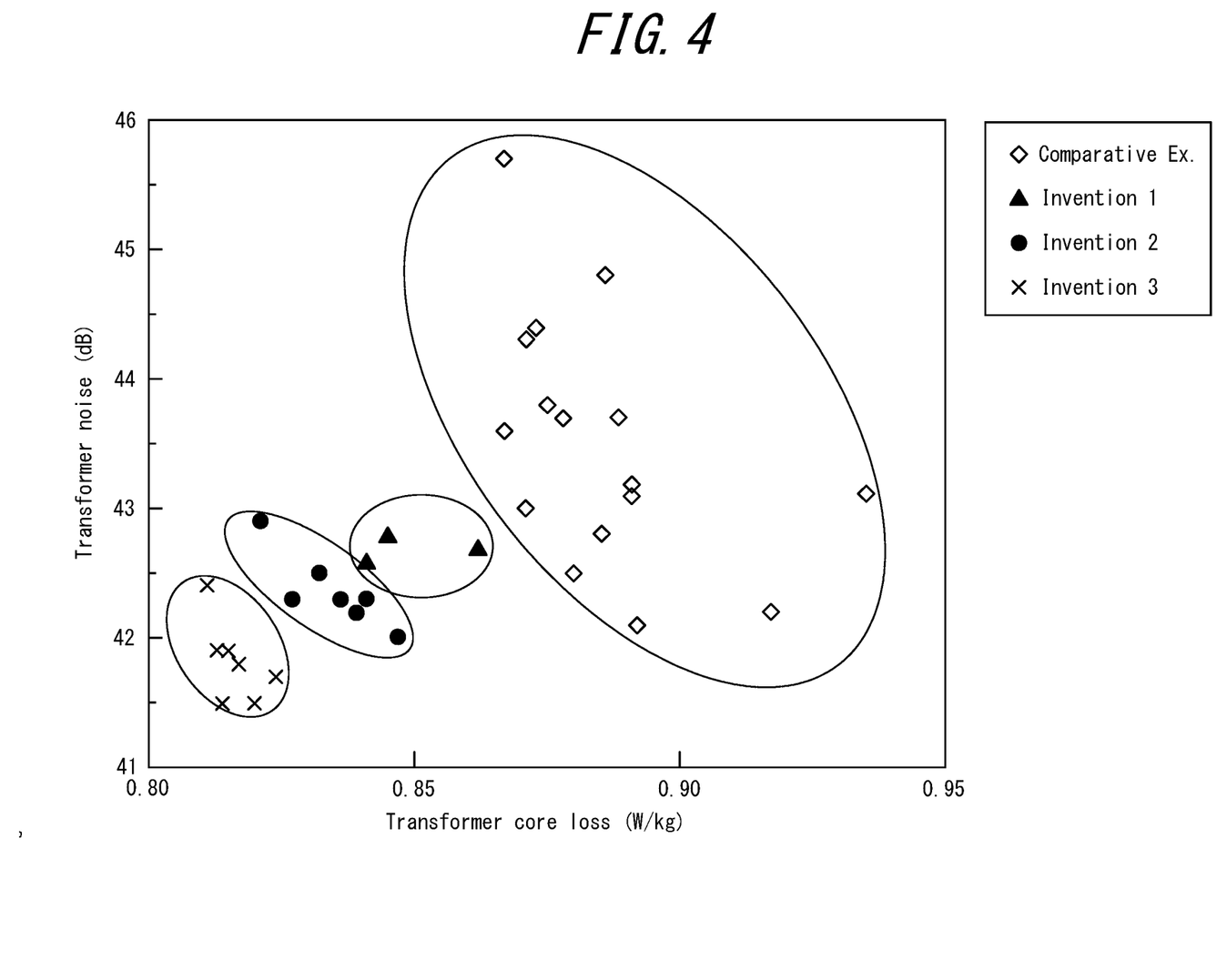
FIG. 4 illustrates a relationship between the transformer core loss and the transformer noise.

FIG. 4 illustrates the balance between the transformer core loss and the transformer noise.

In general, in a material subjected to non-heat-resistant magnetic domain refining, the greater the amount of closure domains introduced, the more the iron loss is reduced and the greater the change in formation and annihilation of closure domains with alternating-current excitation. Accordingly, the magnetostriction amplitude increases, resulting in increased transformer noise. From this follows that transformer iron loss and transformer noise are in inverse relationship. However, as illustrated in FIG. 4, the conditions conforming to the present disclosure produced materials with an excellent balance between transformer iron loss and transformer transformer noise. This effect was more significant under the conditions conforming to Invention 3, Invention 2, and Invention 1, in the stated order.

Example 2

As in Example 1, grain-oriented electrical steel sheets having a sheet thickness of 0.23 mm were subjected to magnetic domain refining treatment by electron beam irradiation for non-heat-resistant magnetic domain refining, where strain sites were introduced to the steel sheets in a dot-sequence manner. In this case, the diameter D of a substantially circular electron beam and the interval A between the centers of adjacent strain introduction portions were set as listed in Table 2.

The resulting grain-oriented electrical steel sheets were used to evaluate transformers as in Example 1, and transformer core loss and noise were evaluated. The results are listed in Table 2.

TABLE 2

| | | | | | | | Closure domains | | | | |
|---|---|---|---|---|---|---|---|---|---|---|---|
| No. | Sheet thickness T (mm) | Accelerating voltage (kV) | Beam diameter D (mm) | Interval A (mm) | A/D | Beam current (mA) | Angle from transverse direction (°) | Width w (mm) | Average interval L (mm) | Area ratio $r_S$ (%) | Cross-sectional area $S_R$ (mm²) |
| 1 | 0.23 | 100 | 0.160 | 0.130 | 0.813 | 12 | 0 | 0.180 | 6 | 3.0 | 0.0117 |
| 2 | 0.23 | 100 | 0.160 | 0.155 | 0.969 | 12 | 0 | 0.180 | 6 | 3.0 | 0.0123 |
| 3 | 0.23 | 100 | 0.160 | 0.170 | 1.063 | 12 | 0 | 0.180 | 6 | 3.0 | 0.0123 |
| 4 | 0.23 | 100 | 0.160 | 0.192 | 1.200 | 12 | 0 | 0.180 | 6 | 3.0 | 0.0122 |
| 5 | 0.23 | 100 | 0.160 | 0.300 | 1.875 | 12 | 0 | 0.180 | 6 | 3.0 | 0.0122 |
| 6 | 0.23 | 100 | 0.160 | 0.400 | 2.500 | 12 | 0 | 0.180 | 5 | 3.0 | 0.0122 |
| 7 | 0.23 | 100 | 0.160 | 0.480 | 3.000 | 12 | 0 | 0.180 | 6 | 3.0 | 0.0121 |
| 8 | 0.23 | 100 | 0.160 | 0.520 | 3.250 | 12 | 0 | 0.180 | 6 | 3.0 | 0.0119 |
| 9 | 0.23 | 100 | 0.160 | 0.600 | 3.750 | 12 | 0 | 0.180 | 6 | 3.0 | 0.0113 |
| 10 | 0.23 | 170 | 0.100 | 0.080 | 0.800 | 13 | 0 | 0.140 | 8 | 1.6 | 0.0129 |
| 11 | 0.23 | 170 | 0.100 | 0.150 | 1.500 | 13 | 0 | 0.140 | 8 | 1.6 | 0.0122 |
| 12 | 0.23 | 210 | 0.060 | 0.070 | 1.167 | 19 | 0 | 0.130 | 8 | 1.6 | 0.0138 |
| 13 | 0.23 | 210 | 0.060 | 0.120 | 2.000 | 19 | 0 | 0.130 | 8 | 1.6 | 0.0138 |

| | | | Closure domains | | Iron loss | | | | | |
|---|---|---|---|---|---|---|---|---|---|---|
| No. | Derived by | $\Delta\lambda_{0-P}$ (×10⁻⁷) | Volume fraction $r_v$ (%) | Depth ratio $r_d$ (%) | Single sheet (W/kg) | Transformer (W/kg) | BF | Transformer noise (dBA) | Remarks | Remarks 2 |
| 1 | magnetic domain observation | | 0.89 | 37.3 | 0.676 | 0.843 | 1.247 | 42.8 | Example | Invention 1 |
| 2 | magnetic domain observation | | 0.89 | 37.1 | 0.675 | 0.840 | 1.244 | 42.8 | Example | Invention 1 |
| 3 | magnetic domain observation | | 0.89 | 37.1 | 0.672 | 0.838 | 1.247 | 42.7 | Example | Invention 1 |
| 4 | magnetostriction measurement | 2.28 | 0.89 | 36.9 | 0.665 | 0.830 | 1.248 | 42.7 | Example | Invention 1 |
| 5 | magnetostriction measurement | 2.27 | 0.88 | 36.8 | 0.660 | 0.823 | 1.247 | 42.6 | Example | Invention 1 |
| 6 | magnetostriction measurement | 2.27 | 0.88 | 36.8 | 0.662 | 0.826 | 1.247 | 42.6 | Example | Invention 1 |
| 7 | magnetostriction measurement | 2.26 | 0.88 | 36.6 | 0.665 | 0.831 | 1.250 | 42.5 | Example | Invention 1 |
| 8 | magnetostriction measurement | 2.22 | 0.86 | 36.0 | 0.681 | 0.848 | 1.245 | 42.5 | Example | Invention 1 |
| 9 | magnetostriction measurement | 2.10 | 0.82 | 34.0 | 0.692 | 0.863 | 1.247 | 42.6 | Example | Invention 1 |
| 10 | magnetic domain observation | | 0.70 | 50.0 | 0.680 | 0.842 | 1.238 | 42.4 | Example | Invention 2 |

TABLE 2-continued

| 11 | magnetostriction measurement | 1.70 | 0.66 | 47.2 | 0.663 | 0.821 | 1.238 | 42.3 | Example | Invention 2 |
| 12 | mgnetic domain observation | | 0.78 | 52.2 | 0.670 | 0.830 | 1.239 | 41.5 | Example | Invention 3 |
| 13 | magnetostriction measurement | 2.00 | 0.78 | 59.8 | 0.659 | 0.811 | 1.231 | 41.3 | Example | Invention 3 |

Figure 5:
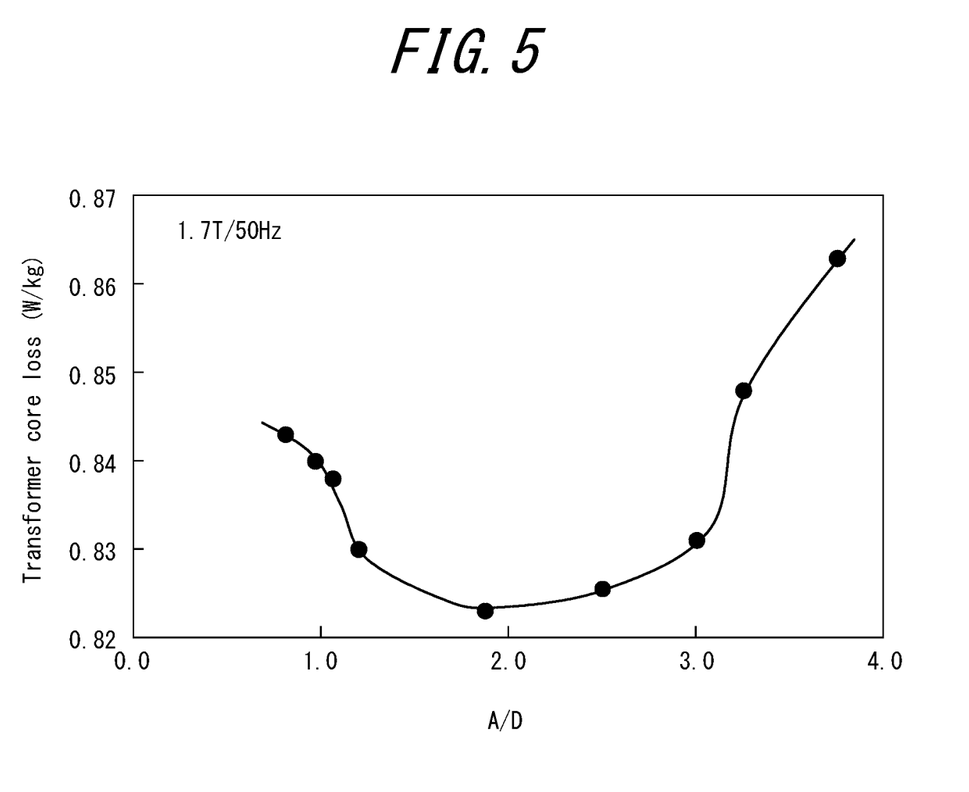
FIG. 5 illustrates a relationship between A/D and the transformer core loss.

FIG. 5 illustrates the change in transformer core loss relative to the change in A/D for Nos. 1 to 9 in Table 2. As can be seen from FIG. 5 and the results in Table 2, when the relation of $1.2D \le A \le 3D$ (i.e., $1.2 \le A/D \le 3$) was satisfied under the conditions conforming to inventions 1, 2, and 3, the iron loss in those electrical steel sheets was further reduced, the BF and transformer noise were not deteriorated, and even better performance was achieved as transformers.

As described above, the present disclosure makes it possible to obtain a material subjected to non-heat-resistant magnetic domain refining with excellent transformer characteristics (iron loss and noise properties).

The invention claimed is:

1. A grain-oriented electrical steel sheet having a tension coating on a surface thereof and subjected to magnetic domain refining treatment by generating linear closure domains extending in a direction within 30° from a transverse direction, wherein:

letting T in mm be a sheet thickness, d in mm be a depth of the closure domains with respect to a surface to which the magnetic domain refining treatment has been applied, L in mm be an average interval between adjacent closure domains on the surface, $S_R$ in mm² be a cross-sectional area of the closure domains in a cross-section orthogonal to linear strain regions, and w in mm be a width of the closure domains, the average interval L is 15 mm or less, a depth ratio $r_d$ in % of a depth of the closure domains to the sheet thickness, calculated by $(d/T) \times 100$, is 35% or more, a volume fraction $r_v$ in % of the closure domains, calculated by $\{S_R/(LT)\} \times 100$, is 0.30% or more and 3.0% or less, an area ratio $r_s$ in % of the closure domains, calculated by $(w/L) \times 100$, is 0.50% or more and 4.0% or less, a transformer iron loss is 0.711 W/kg or more and 0.851 W/kg or less, and a building factor (BF) is 1.211 or more and 1.263 or less.

2. The grain-oriented electrical steel sheet according to claim 1, wherein the depth ratio $r_d$ is 39% or more, and the volume fraction $r_v$ and the area ratio $r_s$ satisfy a relation expressed by:

$$r_s \le 2.6 r_v.$$

3. The grain-oriented electrical steel sheet according to claim 2, wherein the volume fraction $r_v$ is 0.75% or more, and the volume fraction $r_v$ and the area ratio $r_s$ satisfy a relation expressed by:

$$r_s \le 1.2 r_v + 0.9.$$

4. The grain-oriented electrical steel sheet according to claim 1, wherein linear strain sites for generating linear closure domains are formed by a plurality of strain introduction portions being arranged in a dot-sequence manner, and letting D in mm be a diameter of the strain introduction portions and A in mm be a distance between centers of adjacent strain introduction portions, a relation expressed by the following formula is satisfied:

$$1.2D \le A \le 3D.$$

* * * * *